United States Patent [19]

Thiel et al.

[11] Patent Number: 5,343,985
[45] Date of Patent: Sep. 6, 1994

[54] FLOATING-CALIPER SPOT-TYPE DISC BRAKE FOR HIGH-POWERED VEHICLES

[75] Inventors: Rudolf Thiel; Andreas Doell, both of Frankfurt am Main; Georg Halasy-Wimmer, Eschborn, all of Fed. Rep. of Germany

[73] Assignee: Alfred Teves GmbH, Frankfurt am Main, Fed. Rep. of Germany

[21] Appl. No.: 926,489

[22] Filed: Aug. 7, 1992

[30] Foreign Application Priority Data

Aug. 9, 1991 [DE] Fed. Rep. of Germany ....... 4126339

[51] Int. Cl.⁵ .................. F16D 65/092; F16D 55/227
[52] U.S. Cl. ................ 188/72.5; 188/73.39; 188/73.45; 188/73.47
[58] Field of Search ............... 188/71.1, 72.2, 72.4, 188/72.5, 73.1, 73.2, 73.31, 73.32, 73.39, 73.43, 73.44, 73.45, 73.46, 73.47, 250 B, 18 A, 367, 369, 370, 250 G, 250 D; 192/107 R

[56] References Cited

U.S. PATENT DOCUMENTS

| | | | |
|---|---|---|---|
| 3,261,429 | 7/1966 | Burnett et al. | 188/73.47 |
| 3,422,933 | 1/1969 | Van House et al. | 188/72.2 |
| 3,662,864 | 5/1972 | Evans | 188/72.2 |
| 3,722,634 | 5/1973 | Ogasawara et al. | 188/264 G |
| 4,044,864 | 8/1977 | Karasudani | 188/73.36 |
| 4,049,086 | 9/1977 | Rath | 188/73.36 |
| 4,061,209 | 12/1977 | Gee et al. | 188/73.36 |
| 4,146,118 | 3/1979 | Zankl | 188/250 G |
| 4,241,812 | 12/1980 | Burgdorf et al. | 188/250 B |
| 4,350,231 | 9/1982 | Crossman et al. | 192/107 R |
| 4,609,077 | 9/1986 | Nakatsuhara | 188/73.39 |
| 4,650,039 | 3/1987 | Weiler et al. | 188/73.44 |
| 4,905,796 | 3/1990 | Schonenberger et al. | 188/73.39 |
| 4,993,519 | 2/1991 | Thiaux | 188/73.39 |
| 5,025,897 | 6/1991 | Hirashita et al. | 188/73.39 |
| 5,060,766 | 10/1991 | Kondo | 188/73.39 |
| 5,103,939 | 4/1992 | Schroeter | 188/72.5 |
| 5,113,978 | 5/1992 | Weiler et al. | 188/250 B |

FOREIGN PATENT DOCUMENTS

| | | | |
|---|---|---|---|
| 0128543 | 8/1983 | Japan | 188/250 B |
| 3234934 | 10/1991 | Japan | 188/250 B |

*Primary Examiner*—Robert J. Oberleitner
*Assistant Examiner*—Chris Schwartz
*Attorney, Agent, or Firm*—Robert P. Seitter; J. Gordon Lewis

[57] ABSTRACT

The invention is related to a spot-type disc brake with a stationary brake carrier (19) at which a floating caliper (1) is slidingly guided which straddles the edge of a brake disc (10), with two brake cylinders (11, 12) which are positioned on the internal axial side of the brake disc (10) aside each other and whose brake pistons (13, 14) act on the brake shoes (5, 7) which are arranged on the same axial side and in circumferential direction of the brake disc (10) at a distance from each other.

According to the invention a third brake shoe (6) is fixed on the external axial side of the brake disc (10) to the floating caliper (1), which brake shoe is positioned staggered in such a manner that its friction area point of gravity (36) comes to be arranged substantially between the other two brake shoes (5, 7) in the circumferential direction of the brake disc (10). Braking noises and brake rubbing are eliminated by this arrangement.

Further advantages of the inventive brake are constituted by its ease of serviceability in view of an ease of mounting of the brake shoes (5, 6, 7) and by its floating caliper (1) which allows to be manufactured with ease and at but low cost and with but little material, and which simultaneously with a low weight affords an elevated stiffness and a large brake disc diameter.

20 Claims, 7 Drawing Sheets

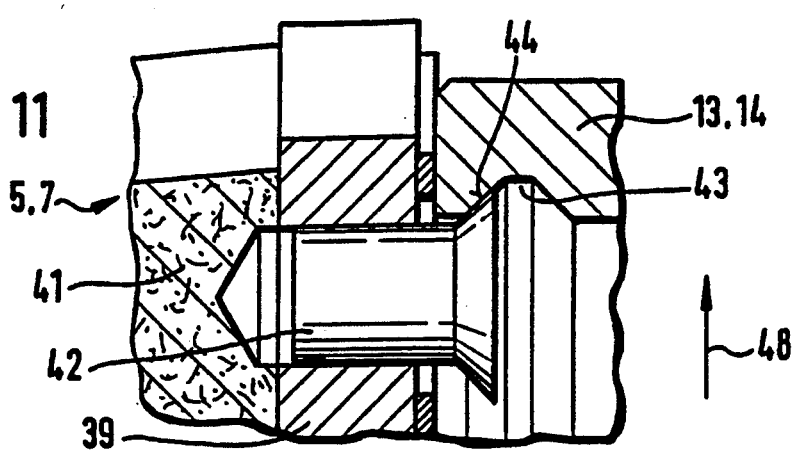
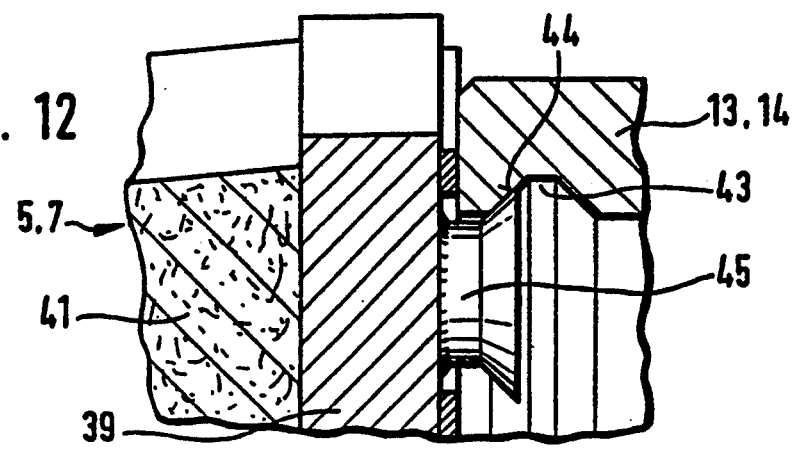
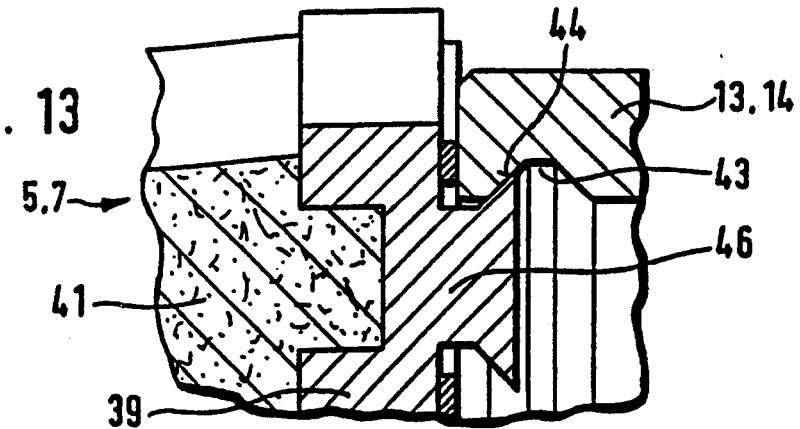

FLOATING-CALIPER SPOT-TYPE DISC BRAKE FOR HIGH-POWERED VEHICLES

BACKGROUND OF THE INVENTION

The invention is related to a floating-caliper spot-type disc brake which is particularly designed for high performance.

Automotive vehicles which reach high driving speeds need high performance brakes, which require as large as possible a brake disc diameter, while the diameter of the vehicle wheels cannot be increased because of other considerations. The mounting space for the brake is thus severely restricted between the external edge of the brake disc and the predetermined diameter of the wheel rim. The brake caliper of a disc brake customarily straddles the external edge of the brake disc, with a bridge of the brake caliper positioned in the forementioned mounting space, and thus the radial dimension of the bridge limits the maximum diameter of the brake disc° The caliper bridge must, on the other hand, have a determined minimum thickness because it transmits the clamping forces which are required for braking action.

From the European patent specification, No. 0 412 541 a disc brake suitable for a high brake power is known, having a brake caliper in the shape of a floating frame which is axially slidingly guided on a brake carrier. The brake carrier in turn is mounted to the steering knuckle of the vehicle by means of pin guides which extend axially beyond the external edge of the brake disc. The floating frame encloses four brake shoes which are disposed on either side of the brake disc and transmits the clamping force. The circumferential forces are transmitted by the brake shoes to the brake carrier. The brake carrier is coupled to the vehicle on the axially internal side of the wheel. In order to be able to also absorb the circumferential forces of the two axially external brake shoes, the brake carrier is furnished with a carrier arm which straddles the external edge of the brake disc.

High-performance brakes require large brake shoe friction surfaces. However an increase in size of the brake shoes particularly in the circumferential direction of the brake disc has the disadvantage that the friction surface is no longer uniformly pressed against the brake disc, even if two brake cylinders arranged side by side are used.

Beyond this, large brake shoes tend to generate braking noises and rubbing, especially when the circumferential force which occurs during braking is transmitted by the brake shoe to the brake housing on the exit side of the brake disc. For this reason, two short-size brake shoes are used which are pressed against the brake disc separately from each other by two brake pistons which are arranged one beside the other.

Another requirement of a high-performance brake is that its weight must be as low as possible. Indeed, heavy brakes present a particular problem because this increases the unsprung masses at the vehicle wheels. This, in turn, has negative effects on the driving performance of the vehicle. The brake power cannot for this reason be increased simply by increasing the brake size.

It is the object of the invention to create a floating-caliper spot-type disc brake with high brake power which does not generate excessive noise and rubbing.

SUMMARY OF THE INVENTION

This object is achieved by arranging the centroids of the friction surfaces of the brake shoes abutted against different axial sides of the brake disc not opposite one another but staggered or offset with respect to one another in the circumferential direction of the brake disc.

The disc brake according to the invention is preferably furnished with three brake shoes, two of which are positioned on the internal axial side of the brake disc and spaced from each other in the circumferential direction. A third brake shoe is disposed on the other axial side and viewed in projection overlaps with its friction surface the friction surfaces of the other two brake shoes. In this configuration, the friction surface area of the third brake shoe preferably corresponds to the sum of the friction surface areas of the other two in order to make sure that all three of the brake linings are abraded at a roughly uniform rate.

In another embodiment according to the invention, four brake shoes are provided, two of which are disposed on the internal axial side and two on the external axial side of the brake disc. The first two brake shoes are spaced a smaller distance from each other in the circumferential direction than the latter two, as a result whereof a staggered or offset arrangement is again created.

It has been found that the staggered or offset arrangement offers the advantage that any rubbing of the brake or braking noises, such as, for example, squealing, are largely avoided. This is believed to result from the main points of stress being disposed spatially staggered or offset along the brake disc, so that vibratory undulations and changes of thickness of the brake disc from one point of stress to the other have a temporary [staggered] balancing effect.

In a preferred embodiment, the circumferential force occurring during braking action is transmitted from a brake shoe being fixed on the external axial side of the floating caliper not directly to the brake carrier but indirectly through the floating caliper. In this case, the brake carrier may be particularly simple and lightweight, since it is not required to extend from one axial side of the brake disc to the other beyond the latter's external edge in order to absorb there directly the circumferential force of an external brake shoe.

A pin guide with a supporting pin transmits the circumferential force and with an elastically guided guide pin offers the advantage that inaccuracies which are due to manufacturing techniques, for example slightly differing distances between the two pins, can be accommodated by the elastic guide.

The supporting pin is preferably disposed symmetrically in the center of the brake. Due to the uniform flux of force at this point and because the pin acts on a zone of the brake carrier which is only lightly stressed, the pin guide cannot practically cant in this arrangement and allows, therefore, free movement.

A preferred embodiment of the brake carrier comprises a circumferentially extending connecting section having a central arm projecting radially therefrom, with a pair of side arms projecting radially at either end. On account of its simple configuration, a brake carrier of this type is particularly suited for integration with the steering knuckle of the vehicle.

In particular with an integrated brake carrier, the supporting pin is preferably press fitted into a bore in the brake carrier. Depending on the spatial conditions, it may, however, be more favorable to press fit the supporting pin into a bore in the floating caliper. The weight of the brake is reduced still further by making the slide fit portion of the supporting pin hollow.

A floating caliper formed as a thin walled shell with openings for installation and removal of the brake shoes results in a very small mass combined with extreme rigidity and affords a large diameter of the brake disc due to a low thickness in the section extending between the external edge of the brake disc and the wheel rim. The requirements of a high-performance brake are, therefore, met particularly well in this instance. This is supplemented by the ease of maintenance because the brake shoes may be easily installed and removed through the openings in the floating caliper.

A two part floating-caliper housing is preferred for simpler manufacturing because the brake cylinder bores can be more easily machined. Connecting the housing parts by means of three screws allows a reduction in the weight of the brake as compared to the use of the typical four screws. Moreover, the vibration performance of the brake is improved by a centrally located screw connection.

The floating caliper could alternatively be of one piece construction. In this case, the brake cylinder bores would have to be machined through to the outside and the hydraulic cylinders subsequently be closed by a cover piece.

A typical mode of fixing the brake shoes as is known from European patent specification, No. 0 412 541 includes retaining pins which are disposed in the space between the wheel rim and the external edge of the brake disc, restricting the maximum possible diameter of the brake disc. Moreover, special tools are required for installation and removal of the brake shoes.

In a preferred arrangement for fixing the brake shoes, these disadvantages are avoided. This arrangement includes a projection on the backplate of the brake shoes within the diameter of the brake disc so as to not restrict the brake disc diameter. For mounting, a brake shoe is inserted from the outside through an opening of the floating caliper, and is urged radially against a spring and the projection is locked to a bore in the floating caliper or in a brake piston, with the projection engaging an edge of the bore. Manual installation and removal may be carried out safely and quickly.

A conical shape of the projection of the backplate ensures that the brake shoe is firmly seated against the edge of the bore in the brake piston or the floating caliper free from any looseness causing rattling.

The spring employed for biasing of each brake shoe to be abutted against the brake piston is formed with clips to grip and be locked to the brake carrier. The spring for biasing of the brake shoe which is fixed to the floating frame may simply be attached with a threaded fastener.

The inventive disc brake is improved so as to reduce noise by forming elongated webs on the brake shoe mounted to the external side of the floating caliper which mate with grooves in the caliper. The webs serve to transmit the circumferential force from the brake shoe disposed on the external axial side of the floating frame. The distances of the webs and grooves relative to one another ensure that the circumferential force is always transmitted through the web on the entering side of the brake disc. Experience has shown that such a "dragged" brake shoe will not undergo noise-generating vibrations.

DESCRIPTION OF THE DRAWINGS

FIG. 11 is a sectioned fragmentary view of the brake shoe together with a pin pressed into a bore of the backplate of a brake shoe together with a fragmentary sectional view of a piston engaged by the pin.

FIG. 12 is a view of a sectional fragmentary brake shoe together with a pin which is welded to the backplate, and a fragmentary sectional view of a piston engaged by the pin.

FIG. 13 is a view of a brake shoe similar to that of FIG. 11, but with a buttonhead through projection which is shaped out of the backplate.

DETAILED DESCRIPTION

Figure 1:
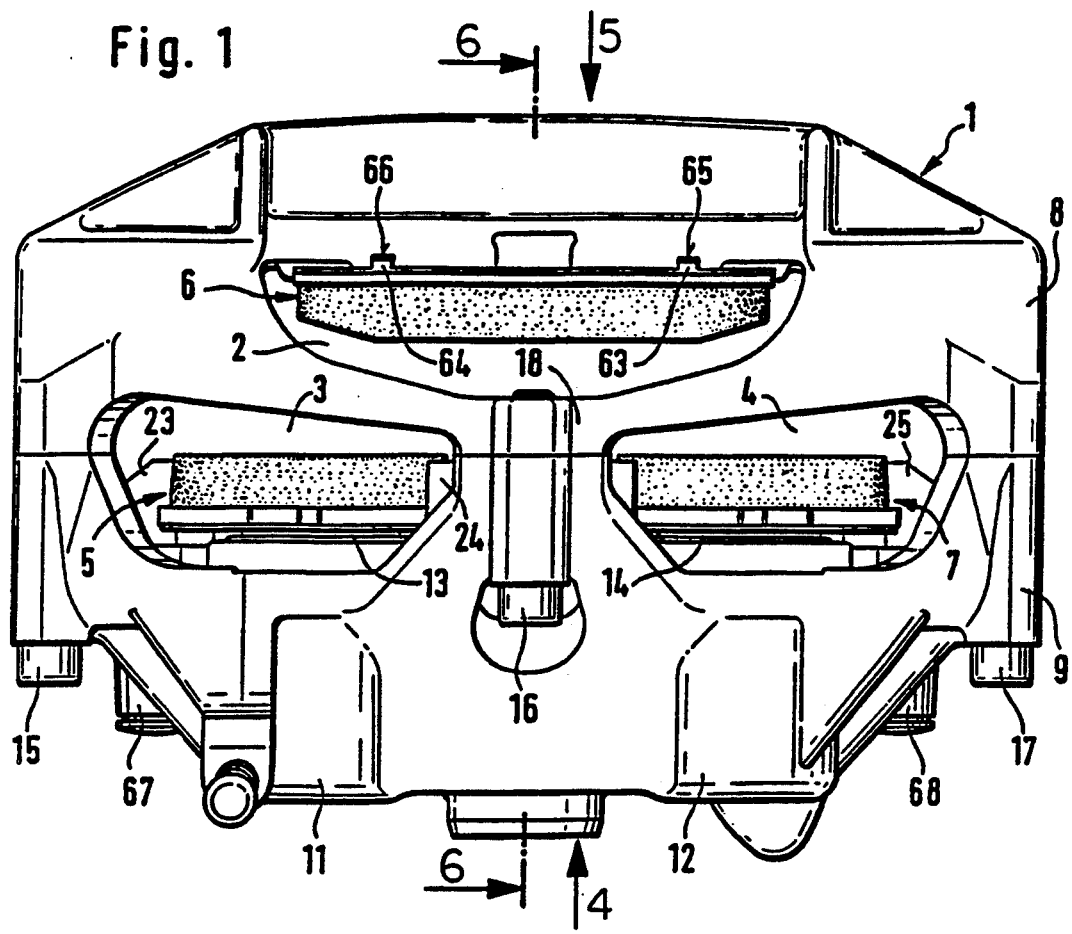
FIG. 1 is a top view of one embodiment of the disc brake according to the invention having three brake shoes.
Figure 2:
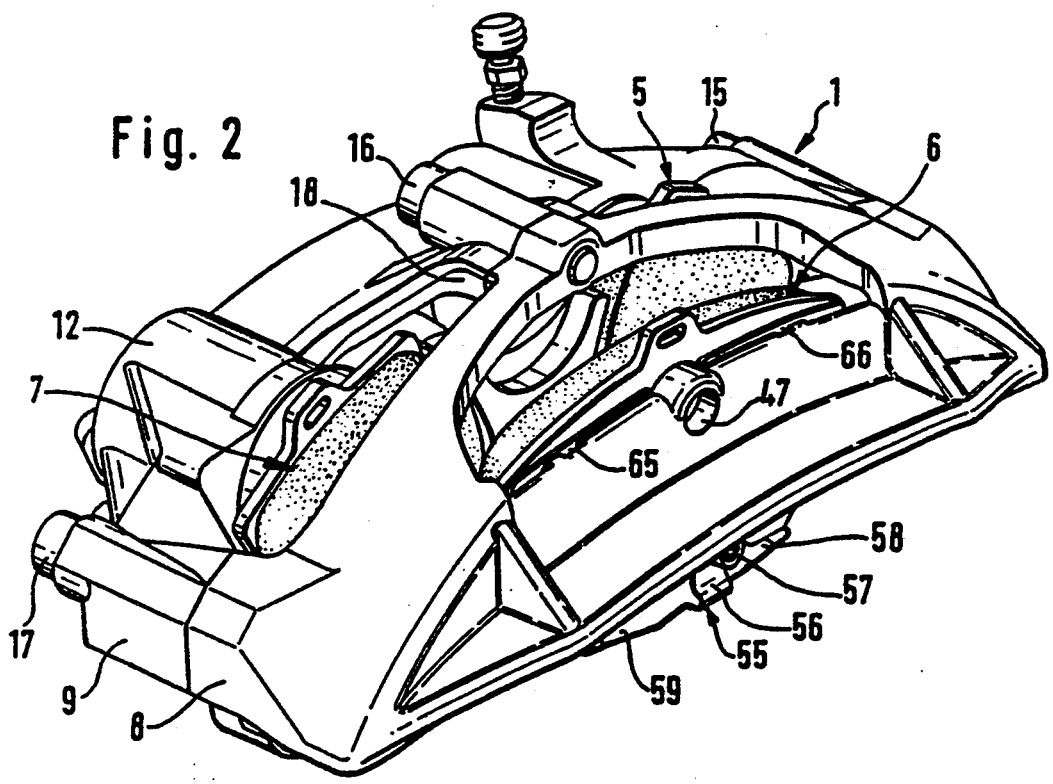
FIG. 2 is a perspective view of the disc brake shown in FIG. 1.

In FIGS. 1 and 2, a floating caliper 1 of a shell-type construction is shown with three large recesses 2, 3, 4, through which three brake shoes 5, 6, 7 can be installed and removed. The floating caliper 1 extends beyond the external edge of a brake disc 10 (FIG. 6) and is provided on the inner axial side with a hydraulic unit which is comprised of brake cylinders 11, 12 positioned side by side, each having a respective brake piston 13, 14.

Figure 4:
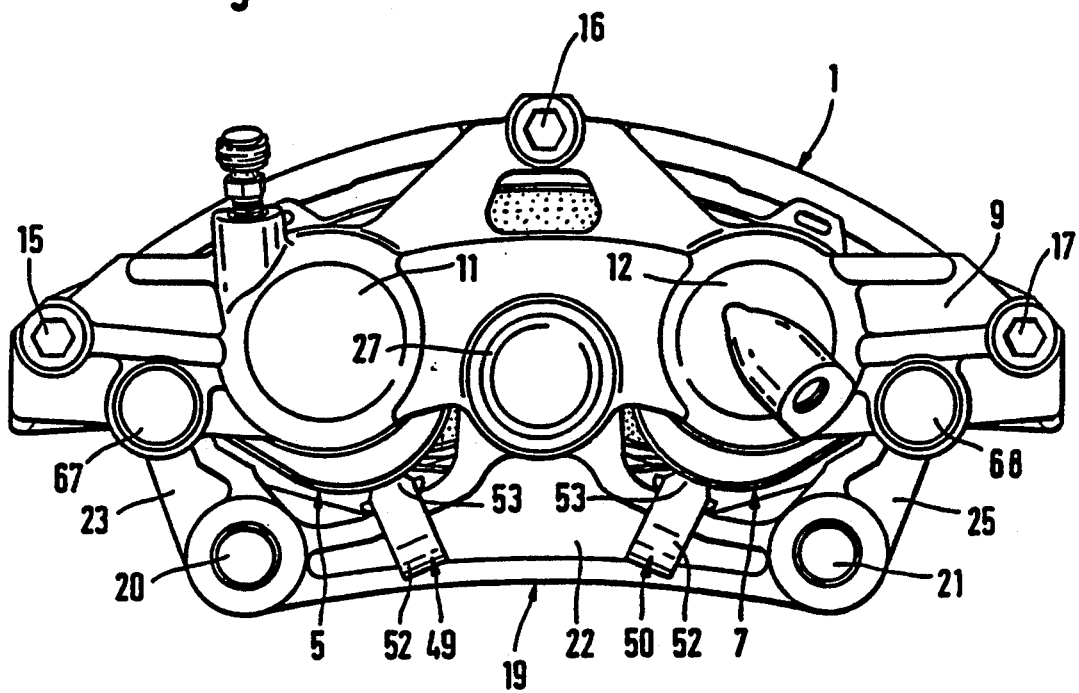
FIG. 4 is a reverse view of the disc brake as seen from the direction 4 in FIG. 1.

The floating caliper 1 is composed of two housing parts 8, 9, which are coupled together by three screws 15, 16, 17. One screw 16 is positioned in the center of the housing and two screws 15, 17 are respectively arranged aligned with an axis of one of the brake pistons 13, 14 (FIG. 4) at the outer margin of the floating caliper 1, as seen in the circumferential direction of the brake disc 10. This arrangement ensures that the screws 15, 16, 17 do not transmit any substantial bending moments and substantially undergo only tensile stresses, such that small sized screws can be employed.

The bridge 18, which is coupled by the screw 16 contributes to the stiffening of the floating caliper 1. On the whole, the floating caliper 1 is optimized for a high-performance brake as to strength and weight due to its shell-type construction with the recesses 2, 3, 4 and due to the arrangement of the screws 15, 16, 17.

Figure 8:
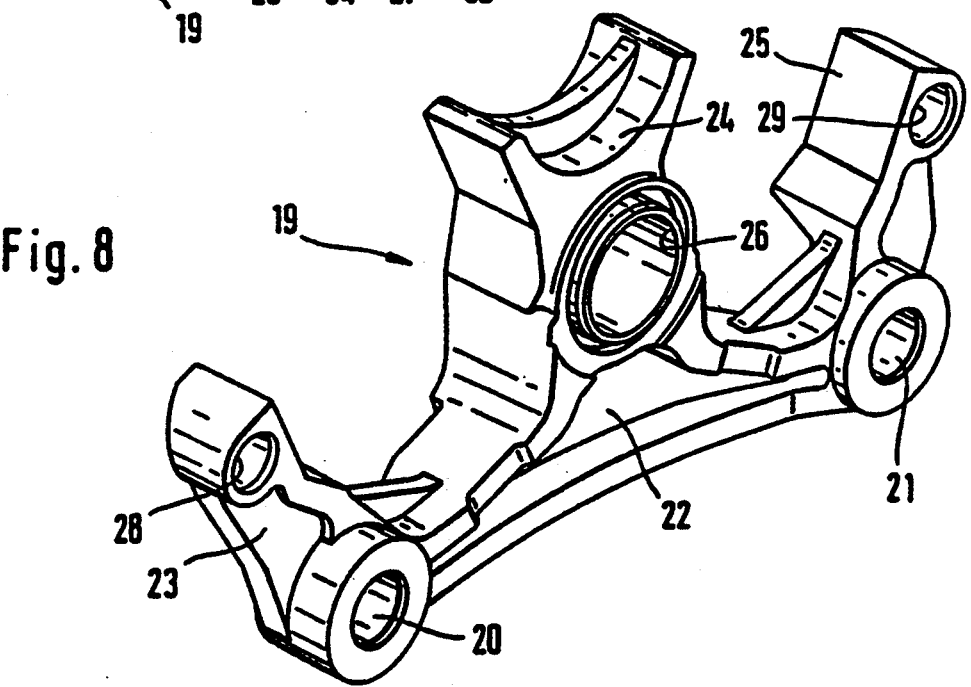
FIG. 8 is a perspective view of the brake carrier.

In FIG. 8, a brake carrier 19 is illustrated which is formed with two bores 20, 21 for receiving two anchor screws serving to anchor it to the steering knuckle of the vehicle (not shown). A central carrier arm 24 and two externally disposed carrier arms 23, 25 extend from a fixing section 22 of the brake carrier 19. Between the carrier arms 23, 24, 25 there are disposed two brake shoes 5, 7, axially slidingly arranged, the carrier arms 23, 24, 25 absorbing the circumferential forces from the brake shoes 5, 7 during braking action. The central carrier arm 24 is furnished with a bore 26 to accommodate a supporting pin 27 (FIG. 6), and the two external carrier arms 23, 25 are formed with bores 28, 29 for the two guide pins 30, 31.

The pins 27, 30, 31 support the floating caliper 1 to be axially slidingly guided on the brake carrier 19.

Figure 6:
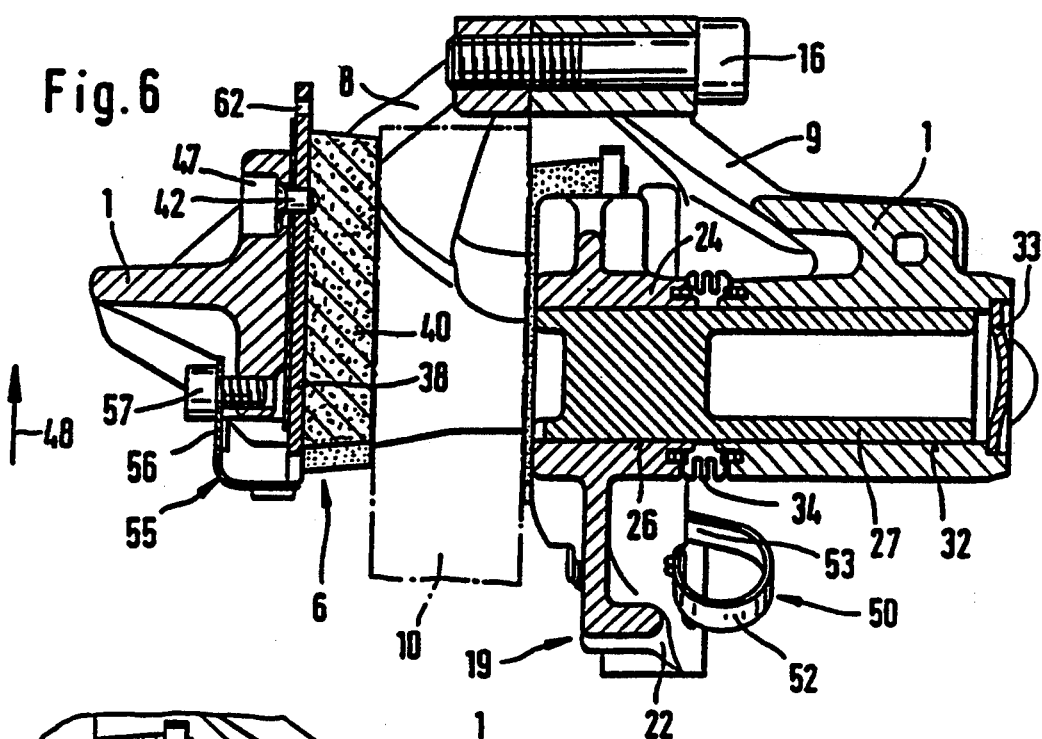
FIG. 6 is a cross section along the line 6—6 in FIG. 1, showing a supporting pin which is pressed into the brake carrier.

As is best seen in FIG. 6, the brake shoe 6 which is disposed on the external axial side of the brake disc 10 is fixed to the floating caliper 1. The circumferential force which occurs during braking at the brake shoe 6 will be transmitted through the floating caliper 1 to the internal axial side and there to the supporting pin 27 which takes support on the brake carrier 19. The supporting pin 27 must be of substantial size and is firmly pressed into the bore 26 of the brake carrier 19, and is closely fit to slide with minimal clearance within a bore 32 of the floating caliper 1. For protection against dusts [said] bore 32 is closed by a cover 33, and an elastic sleeve 34 is positioned around the supporting pin 27 between the floating caliper 1 and the brake carrier 19 for this same purpose.

Figure 7:
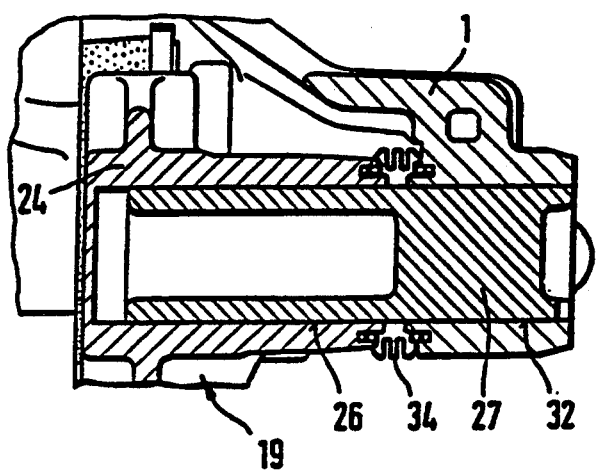
FIG. 7 is an enlarged sectional view of the components shown in FIG. 6, but with a supporting pin pressed into the floating caliper.

In another embodiment which is illustrated in FIG. 7, the supporting pin 27 is pressed into the bore 32 of the floating caliper 1, whereas it axially slides in the bore 26 of the brake carrier 19. The section of the supporting pin 27 which is pressed in in each instance is solid for maximum rigidity, while the sliding section is hollow in order to save weight.

The guide pins 30, 31 slide in two elastic bearings 67, 68 in this embodiment. They do not transmit any circumferential forces but are intended exclusively for the self aligning guidance of the floating caliper 1 and therefore, may be of small size. The guide has a play due to the elasticity of the bearings 67, 68, by which inaccuracies may be accommodated which are due to the manufacturing tolerances.

Figure 3:
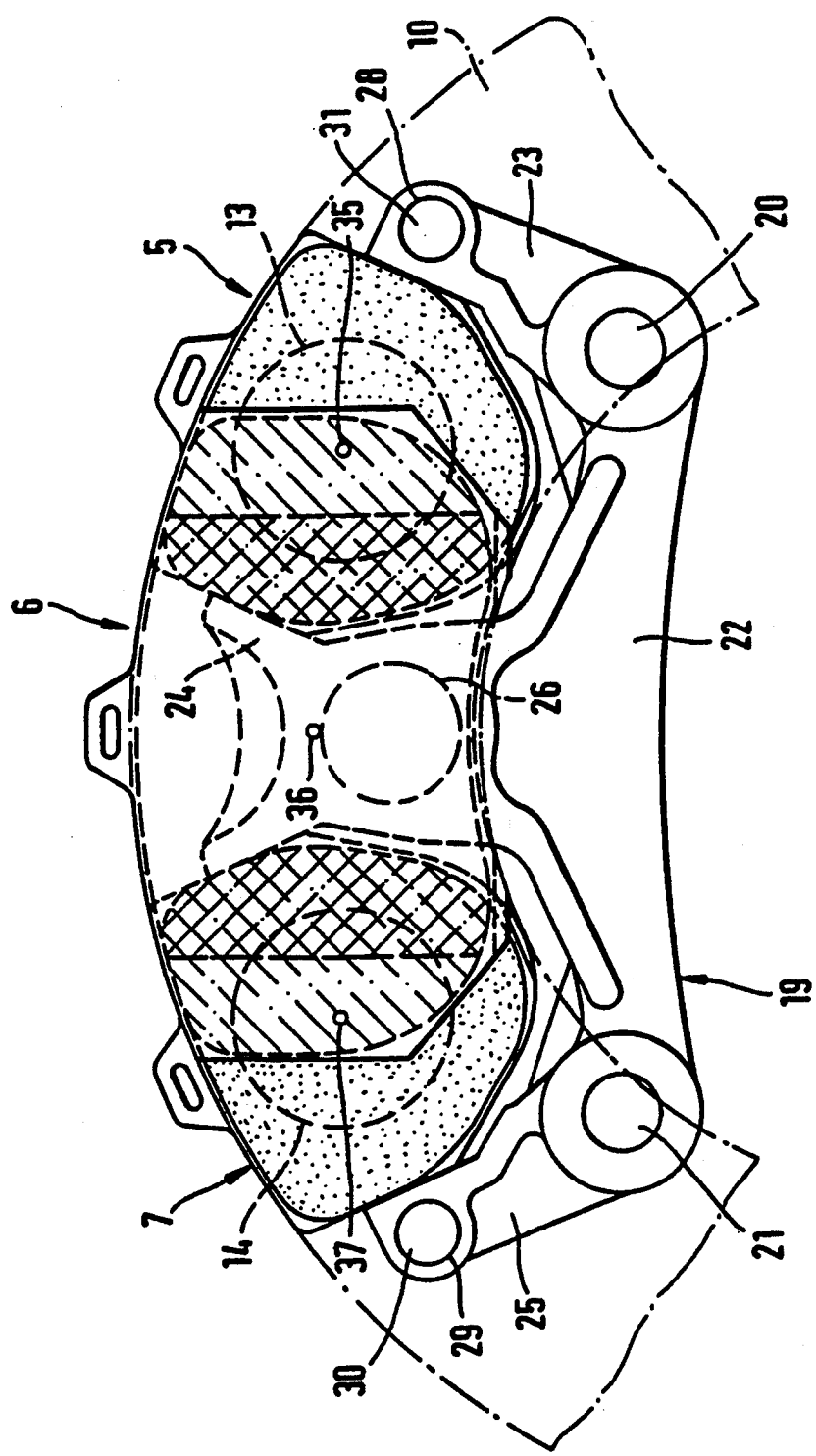
FIG. 3 is a diagrammatic representation of the friction surfaces of the brake shoes illustrating the staggered or offset arrangement.

As is visible in FIGS. 1 and 3, the brake shoes 5, 6, 7 are disposed staggered or offset in the circumferential direction of the brake disc 10. The centroid 36 of the friction surface of the brake shoe 6 is positioned, in the projection (FIG. 3), in the middle between the centroids 35, 37 of the friction surfaces of the brake shoes 5, 7. The friction surface area of the brake shoe 6 corresponds to the sum of the friction surface areas of the brake shoes 5, 7 and overlaps with the latter as is outlined by shading in FIG. 3.

Figure 3A:
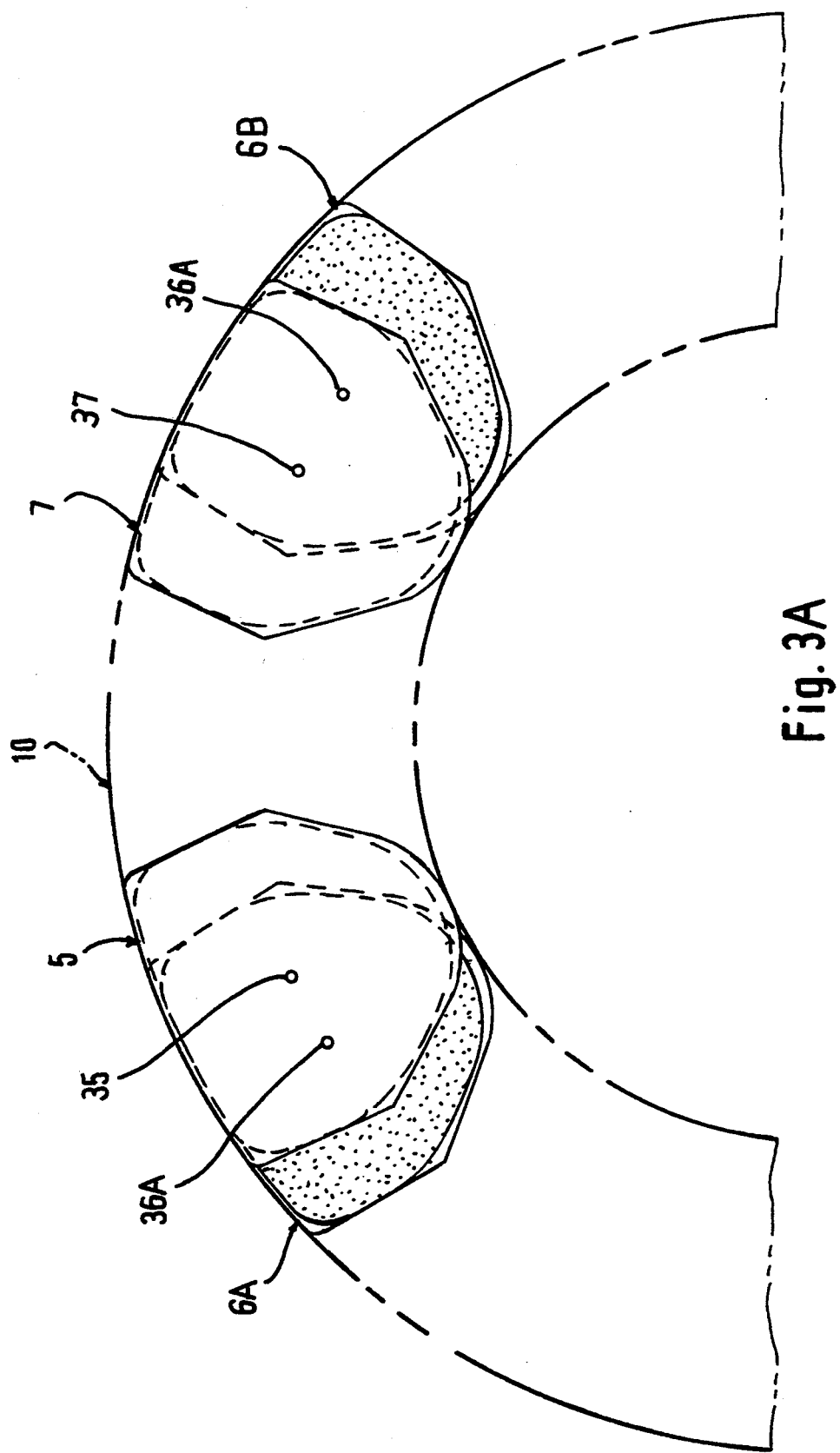
FIG. 3A is a diagrammatic representation of the brake shoes an alternate embodiment of the disc brake according to the invention alternate embodiment.

Alternatively, two brake shoes 6A, 6B can be fixed to the floating caliper 1 having their centroids more widely spaced circumferentially than the two internal brake shoes (see FIG. 3A).

Figure 9:
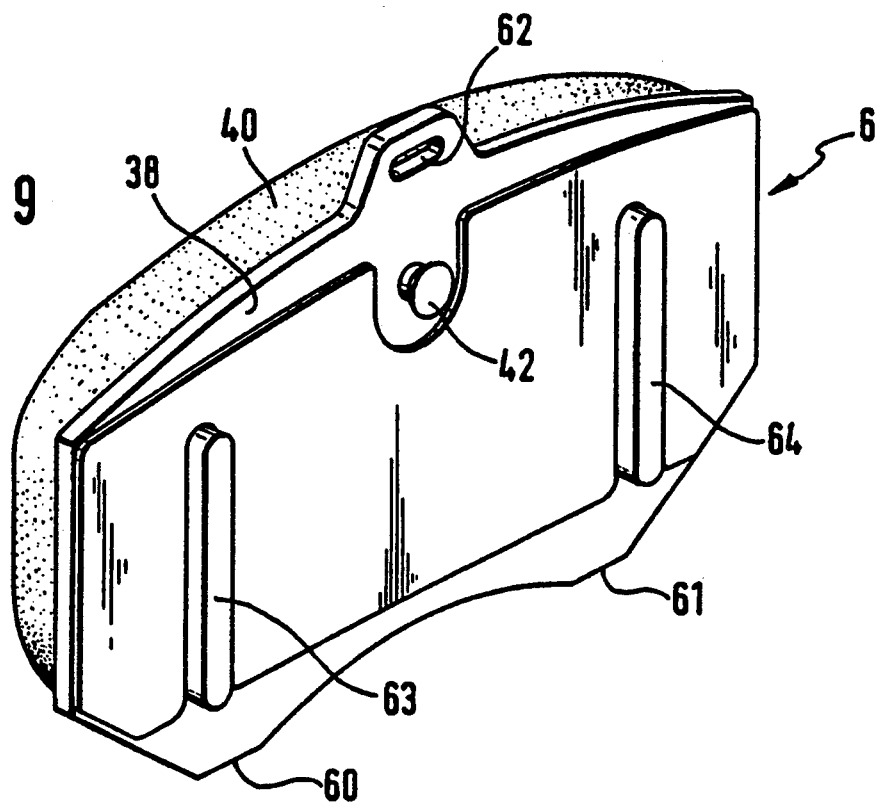
FIG. 9 is a perspective view of the brake shoe fixed to the floating caliper.
Figure 10:
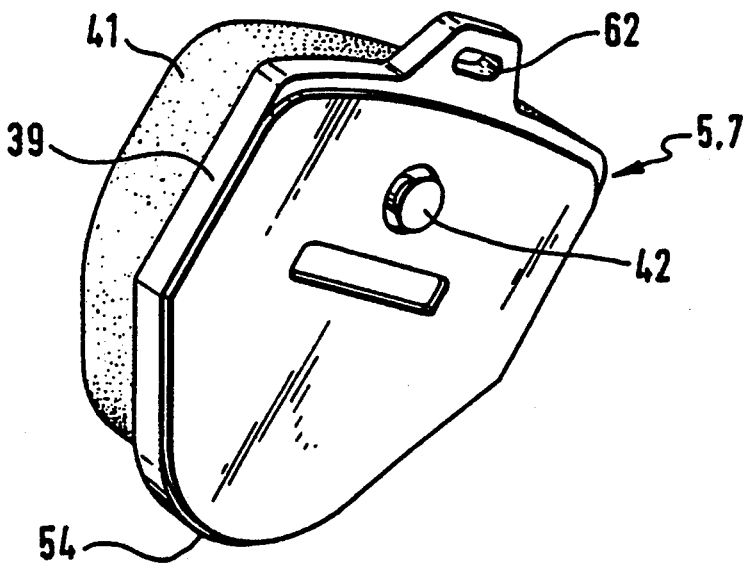
FIG. 10 is a perspective view of the brake shoe which is intended to be fixed to the brake carrier and to the brake piston.

In FIGS. 9 and 10 the brake shoes 5, 6, 7 are shown individually. Each of them is substantially comprised of a backplate 38, 39 and of a friction lining 40, 41. On the side of the backplate 38, 39 facing away from the friction lining 40, 41, a pin 42 is pressed in which is intended for fixing of the brake shoe 5, 6, 7 in the brake. As is shown in FIG. 11 by example of the brake shoe 5, 7, the pin 42 is conically widened toward its free end and engages a hollow brake piston 13, 14 where it is locked in a circumferential annular groove 43 and is in abutment with a conical section 44 of the annular groove 43.

As an alternative to this, a modified pin 45 may also be welded to the backplate 38 or 39 as is shown in FIG. 12, as by friction welding. In a version which is illustrated in FIG. 13, a separate pin is eliminated. In this instance, the backplate 38 or 39 is formed with a buttonhead through projection 46 whose projecting end has a conical shape.

For fixing of the brake shoe 6, the floating caliper 1 is provided with a stepped bore 47 which is engaged by the pin 42 (FIG. 6).

Figure 5:
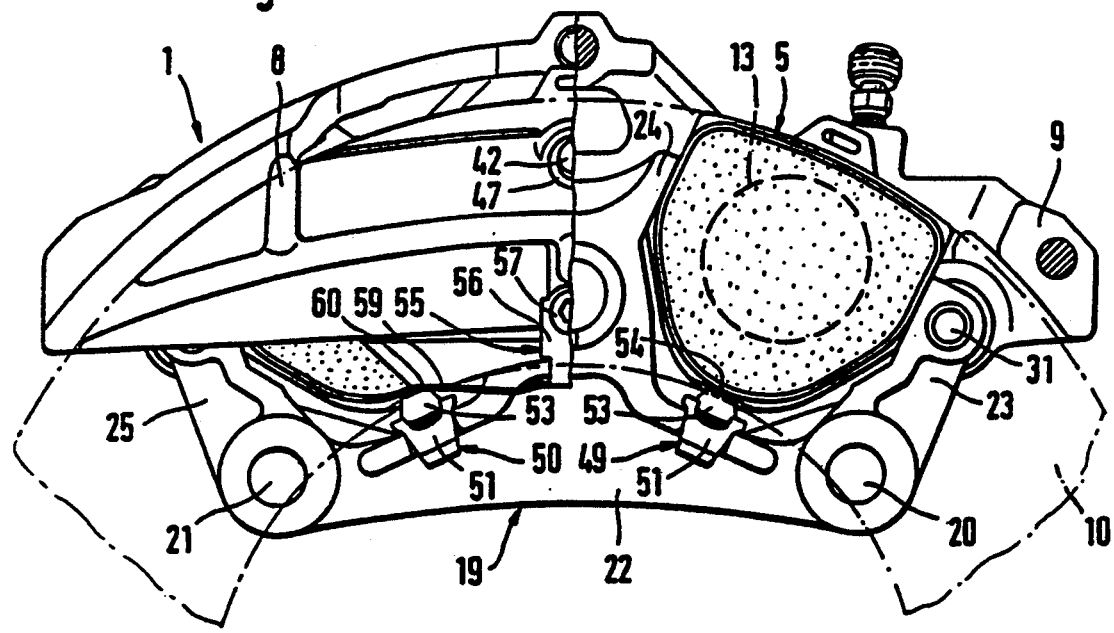
FIG. 5 is a partly sectioned front view of the disc brake as seen from the direction 5 in FIG. 1.

In order that a brake shoe 5, 6, 7 is firmly locked with its pin 42 in the annular groove 43 or in the stepped bore 47, it has to be biased outwardly in the radial direction 48. Two leaf springs 49, 50 are fixed to the brake carrier 19 (FIGS. 4, 5) for the biasing of the brake shoes 5, 7. Each of the leaf springs 49, 50 has two anchor clips 51, 52 which grip the section 22 of the brake carrier 19 and lock there. The free end of the anchor clip 52 which is bent over loop-shaped is utilized as a spring tongue 53 which is in abutment against the radially narrow side 54 of the brake shoe 5, 7 and urges it into the radial direction 48.

The other brake shoe 6 is biased by another leaf spring 55 which is fixed at its central section 56 by means of a screw 57 to the floating caliper 1. The leaf spring 55 is formed with two spring arms 58, 59 which, starting from the central section 56, point in opposite directions and are abutted against two points 60, 61 of the radially narrow side of the brake shoe 6.

At their radially external narrow sides, each of the backplates 38, 39 of the brake shoes 5, 6, 7 is furnished with an ear 62 which serves to facilitate mounting. If, for example, a brake shoe 5, 6, 7 jams it will be possible to get a firm grip with a suitable tool at the ear 62 in order to be able to pull more firmly.

The backplate 38 of the brake shoe 6 is provided with two webs 63, 64 which extend at right angles to the circumferential direction of the brake disc 10 and parallel to each other. The webs 63, 64 engage associated grooves 65, 66 of the floating caliper 1. The width and the distance of the grooves 65, 66 are slightly larger than those of the webs 63, 64 so that the circumferential force will always be transmitted from the brake shoe 6 to the floating caliper 1 through the web which is positioned on the entering side of the brake disc.

We claim:

1. A floating-caliper spot-type disc brake for an automotive vehicle having a brake disc and a steering knuckle, said disc brake including a brake carrier which is fixed to said steering knuckle; a floating caliper having a first part on an axially internal side of said brake disc and a second part on an axially external side of said disc, said first and second parts connected together across an external edge of said brake disc;

means axially slidingly guiding said floating caliper on said brake carrier including pin guides received in said floating caliper and brake carrier; a plurality of brake shoes disposed on either side of said brake disc, said plurality of brake shoes including a first and a second brake shoe arranged on an axial internal side of said brake disc along the circumference thereof and widely spaced apart a substantial distance from each other in the circumferential direction, said first and second brake shoes supported on portions of said brake carrier extending between and on either side of said first and second brake shoes; hydraulic actuating means adapted to urge said plurality of brake shoes against said brake disc, said hydraulic actuating means mounted on said first part of said floating caliper on said axially internal side of said brake disc;

said hydraulic actuating means comprised of at least two brake cylinders with brake pistons sliding therein;

said plurality of brake shoes also including a third brake shoe disposed on said second part of said floating caliper on said axially external side of said brake disc;

each of said first and second brake shoes having a friction surface facing said axially internal side of said brake disc;

said third brake shoe having a friction surface facing said axially external side of said brake disc a centroid of said friction surface of said third brake shoe substantially centered between a centroid of the friction surface of each of said first and second brake shoes, said third brake shoe extending across said widely spaced apart distance of said first and second brake shoes.

2. A spot-type disc brake as claimed in claim 1, wherein said means mounting said floating caliper on said brake carrier comprises pin guide means including a supporting pin received in each of a bore in said floating caliper and said brake carrier, said supporting pin press fit in one of said bores and axially slidable and closely fit within the other of said bores, and which supporting pin absorbs substantially the entire circumferential force exerted by said third brake shoe; and further includes at least one smaller sized guide pin extending between said floating caliper and brake carrier, which solely provides guidance of said floating caliper, said guide pin supported for self adjusting movement elastically with play within a bearing carried by said floating caliper.

3. A spot-type disc brake as claimed in claim 2, wherein said supporting pin is positioned in a space between said brake cylinders and between said first and second brake shoes; and in that a guide pin is positioned on either circumferentially spaced side of said brake.

4. A spot-type disc brake as claimed in claim 3, wherein said brake carrier is comprised of a fixing section which extends substantially in the circumferential direction of said brake disc, a central carrier arm projecting radially from said fixing section and two side carrier arms positioned on either side of said central carrier arm in the circumferential direction extending radially in the direction towards the edge of said brake disc, said first and said second brake shoes each positioned between said central carrier arm and a respective side carrier arm; said central carrier arm formed with said bore receiving said supporting pin; said two side carrier arms each receiving a respective one of said guide pins.

5. A spot-type disc brake as claimed in claim 2, wherein said supporting pin is press fit into another bore in said brake carrier and axially slides in said bore in said floating caliper.

6. A spot-type disc brake as claimed in claim 5, wherein said supporting pin is hollow in a portion slidably received in said bore in said floating caliper.

7. A spot-type disc brake as claimed in claim 2, wherein said supporting pin is press fit into a bore in said floating caliper and axially slides in said bore in said brake carrier.

8. A spot-type disc brake as claimed in claim 1, wherein said plurality of brake shoes each comprise a friction lining providing said friction surface thereof, and a backplate, wherein at least one brake shoe has an axial projection on a side of said backplate facing away from said friction lining, said axial projection widened toward a free end; an edge extending about the interior of a bore in adjacent structure carried by said floating caliper; means urging said at least one brake shoe in a radial direction to cause said projection to be seated against said edge whereby said projection is safely yet detachably locked in said bore.

9. A spot-type disc brake as claimed in claim 8, wherein said projection consists of a pin fixed to said backplate.

10. A spot-type disc brake as claimed in claim 8, wherein said projection of said brake shoe is integrally formed in said backplate.

11. A spot-type disc brake as claimed in claim 8, wherein said projection of said brake shoe is conically widened toward its free end and in that said edge defines a corresponding conical shape.

12. A spot-type disc brake as claimed in claim 8, further including a leaf spring fixed to said brake carrier, said leaf spring formed with at least two anchor clips which grip a portion of said brake carrier to be locked there; and wherein said leaf spring is formed with a spring tongue in abutment against a radially narrow side of said first or said second brake shoe, urging said brake shoe in a radial outward direction.

13. A spot-type disc brake as claimed in claim 8, wherein a radially external side of said floating caliper has a leaf spring attached having at least one spring tongue in abutment against a radially narrow side of said third brake shoe urging said third brake shoe in a radial outward direction.

14. A spot-type disc brake as claimed in claim 1, wherein said floating caliper first and second parts each includes a joined portion extending axially towards the joined portion of the other part, said joined portions joined together to form a connection across said brake disc edge of said first and second parts of said floating caliper, said first and second parts joined portions together formed with a plurality of openings, each opening located over a respective brake shoe, whereby each of said plurality of brake shoes may be inserted or withdrawn radially through a respective opening.

15. A spot-type disc brake as claimed in claim 14, wherein said floating-caliper first and second parts joined portions abut each other in the plane of said brake disc; said abutting joined portions held together by three screws, each of which extending parallel to the axis of said brake disc and a central one of said screws centrally positioned with respect to said floating caliper, two other of said screws on either side of said floating caliper spaced apart along the circumferential direction.

16. A spot-type disc brake as claimed in claim 1 wherein said third brake shoe is comprised of a friction lining providing said friction surface thereof, and of an attached backplate, said backplate formed on a side facing away from said friction lining with two elongated, parallel, webs which extend along the said backplate substantially at right angles to the circumferential direction of said brake disc, and spaced from each other in the circumferential direction; said floating caliper formed with associated and correspondingly positioned grooves engaged by said webs; and, said grooves each slightly wider than said webs and spaced slightly wider apart in the circumferential direction, so that only the web on the disc external side is engaged, whereby said web engaging said floating caliper causes said brake shoe to be held so as to be dragged on said brake disc.

17. A spot-type disc brake as claimed in claim 16, wherein said webs are integral with said backplate.

18. A spot-type disc brake as claimed in claim 1, wherein said friction surface of said third brake shoe has an area substantially equal to the sum of the areas of said friction surfaces of said first and said second brake shoes.

19. A spot-type disc brake as claimed in claim 1 wherein the centroid of the friction surface of said third brake shoe is aligned substantially in the middle of said centroids of said friction surfaces of said second and first brake shoes.

20. A floating-caliper spot-type disc brake for an automotive vehicle having a brake disc and a steering knuckle, said disc brake including a brake carrier which is fixed to said steering knuckle;

a floating caliper having a first part on an axially internal side of said brake disc and a second part on an axially external side of said disc, said first and second parts connected together across an external edge of said brake disc;

means axially slidingly guiding said floating caliper on said brake carrier including pin guides received in said floating caliper and brake carrier;

a plurality of brake shoes disposed on either side of said brake disc, said plurality of brake shoes including a first and a second brake shoe arranged on an axial internal side of said brake disc along the circumference thereof and widely spaced apart a substantial distance from each other in the circumferential direction, said first and second brake shoes supported on portions of said brake carrier extending between and on either side of said first and second brake shoes;

hydraulic actuating means adapted to urge said plurality of brake shoes against said brake disc, said hydraulic actuating means mounted on said first part of said floating caliper on said axially internal side of said brake disc; said hydraulic actuating means comprised of at least two brake cylinders with brake pistons sliding therein;

said plurality of brake shoes also including a third and a fourth brake shoe, each having a friction surface facing said external side of said brake disc and widely spaced circumferentially apart a substantial distance and mounted to said floating caliper;

said third and fourth brake shoes friction surfaces having centroids spaced apart circumferentially a distance which is substantially different from the distance of said circumferential spacing of said centroids of said friction surfaces of said first and second brake shoes.

* * * * *